United States Patent [19]

Lossl et al.

[11] Patent Number: 4,633,847
[45] Date of Patent: * Jan. 6, 1987

[54] MULTIPLE-BLADE INTERNAL-HOLE SAW FOR SAWING CRYSTALLINE RODS

[75] Inventors: Gunter Lossl, Kirchweidach; Helmut Zauhar; Horst Stock, both of Burghausen, all of Fed. Rep. of Germany

[73] Assignee: Wacker-Chemie Gesellschaft fur Elektronik-Grundstoffe mbH, Munich, Fed. Rep. of Germany

[*] Notice: The portion of the term of this patent subsequent to Apr. 30, 2002 has been disclaimed.

[21] Appl. No.: 721,176

[22] Filed: Apr. 8, 1985

Related U.S. Application Data

[63] Continuation of Ser. No. 487,200, Apr. 21, 1983, Pat. No. 4,513,544.

[30] Foreign Application Priority Data

Apr. 30, 1982 [DE] Fed. Rep. of Germany ....... 3216200

[51] Int. Cl.⁴ .............................................. B28D 1/04
[52] U.S. Cl. .................................... 125/13 R; 125/15; 51/73 R
[58] Field of Search ............... 125/15, 13 R; 51/73 R, 51/283 R

[56] References Cited

U.S. PATENT DOCUMENTS 3,081,586  3/1963  Gersbach .
4,091,580  5/1978  Oates .
4,150,912  4/1979  Gutsche et al. .
4,177,789 12/1979  Marocco .
4,227,348 10/1980  Demers .
4,228,782 10/1980  Demers et al. .

FOREIGN PATENT DOCUMENTS 272883 10/1970 U.S.S.R. .

Primary Examiner—Harold D. Whitehead
Attorney, Agent, or Firm—Burgess, Ryan & Wayne

[57] ABSTRACT

Crystalline rods or blocks can be sawed into thin wafers by sawing the rod or block into a plurality of wafers that are connected to each other. The wafers can be connected by introducing a connecting agent after each sawing step, into the resulting cutting gaps. The wafers are separated only after the whole rod has been sawed with a two-blade internal-hole saw.

3 Claims, 5 Drawing Figures

MULTIPLE-BLADE INTERNAL-HOLE SAW FOR SAWING CRYSTALLINE RODS

This is a division of application Ser. No. 487,200, filed Apr. 21, 1983, now U.S. Pat. No. 4,513,544 issued Apr. 30, 1985.

The present invention is directed to a multiple-blade internal-hole saw for sawing crystalline rods.

BACKGROUND OF THE INVENTION

When sawing crystalline rods of, for example, silicon, gallium arsenide, indium phosphide, sapphire or gallium-gadolinium garnet into wafers of approximately from 0.1 to 1 mm thickness, internal-hole saws are customarily used. An internal-hole saw comprises a rotating, circular saw blade that is clamped at its outside edge and has, in the center, a hole having a diameter of a few centimeters, the circumference to the hole being set with diamonds and forming the actual cutting edge. When a crystalline rod is to be cut into wafers, it is first passed into the hole in the centre of the saw blade to a depth corresponding to the desired wafer thickness. Then, either the rod, which can be rotating, is moved outwards against the rotating cutting edge (see, for example, U.S. Pat. No. 3,025,738 and U.S. Pat. No. 3,039,235), or the rotating saw blade, is guided through the crystalline rod. In the final phase of cutting, uncontrolled breaks in weak residual portions between wafer and rod, breaks in the wafer and rod, breaks in the wafer surface, or breakage and loss of the whole wafer may occur due to the thinness of the wafer (usually approximately 400 um), the brittleness of the material, or the sucking action of the rotating saw blade.

Attempts have been made to solve the breakage problem by use of expensive removal devices (see, for example, DE-OS No. 30 10 867). In the method disclosed in the patent, the crystalline rod to be sawed is cemented to a cutting ledge which is not completely cut through during the sawing operation. The cutting ledge is useful for holding and feeding the rod and for stabilising the separated wafer. Apart from the expensive apparatus, the arrangement requires that each individual wafer be removed immediately after the cutting operation. The device therefore cannot be used with an internal-hole saw having a plurality of saw blades. Internal-hole saws with multiple blades are useful when an increase in cutting capacity is desired.

BRIEF SUMMARY OF THE INVENTION

The object of the invention is to provide a multiple-blade internal-hole saw for sawing crystalline rods or blocks with reduced wafer breakage. According to the present invention, the crystalline rod or block is sawed by a sequence of cuts into a plurality of wafers that are connected to one another and the connection between the wafers is broken in a subsequent second step.

The present invention is particularly useful for sawing finely crystalline, polycrystalline, coarsely crystalline or monocrystalline rods or blocks, of silicon. The method is also useful for sawing germanium, gallium arsenide, gallium phosphide, indium phosphide and the like. The method is also suitable for sawing rods or blocks of gallium-gadolinium garnet, lithium niobate, sapphire, spinel, ruby, corundum or other pressed, sintered or ceramic material, and the like.

The saw of the present invention has the advantage that the crystalline rod is not sawed into individual wafers that must be removed individually after each sawing operation, but produces a plurality of wafers that are connected to one another. Since the wafers are connected to one another, expensive removal devices are not required and it is possible to use multiple-blade internal-hole saws, particularly two-blade internal-hole saws which provide an increase in the cutting capacity. If desired, a single blade hole saw can be used in the method of the invention. The invention can also be used with other saws but it is particularly advantageous when used with an internal-hole saw.

DETAILED DESCRIPTION OF THE INVENTION

The connection of the wafers to one another within the method of the present invention can be effected by the actual material of the rod or block itself that is, the individual portions are not completely sawed through and separated from one another. If the rod or block is completely cut through, the connection may be effected by a foreign material in the form of cutting ledges or bindings fixed to the workpiece which are not completely cut through and which hold the portions of the rod or block together. The connection can, however, be formed or strengthened by introducing a connecting agent into the cutting gaps, by means of a suitable filling means. Introducing a connecting agent into the cutting gaps is especially useful if portions of the rod or block having the thickness of only a few wafers, are to be sawed. Often an additional connection is only necessary when the portion to be sawed has only a thickness of about 5-15 wafers. In this case, the application of fixed or mechanically movable bindings, e.g. in the form of supporting pincers has proved advantageous. After the whole block or rod has been sawed, the connection between the wafers is broken. Residual connecting portions of rods or blocks can be removed, for example, by cutting or grinding the ledges or bindings which act as foreign connecting material, and the connecting agent that has been introduced into the cutting gaps, can be detached or dissolved.

The method of the invention, for sawing a crystalline rod, using a two-blade internal-hole saw, is explained, by way of example, with reference to FIGS. 1 through 4.

Figure 5:
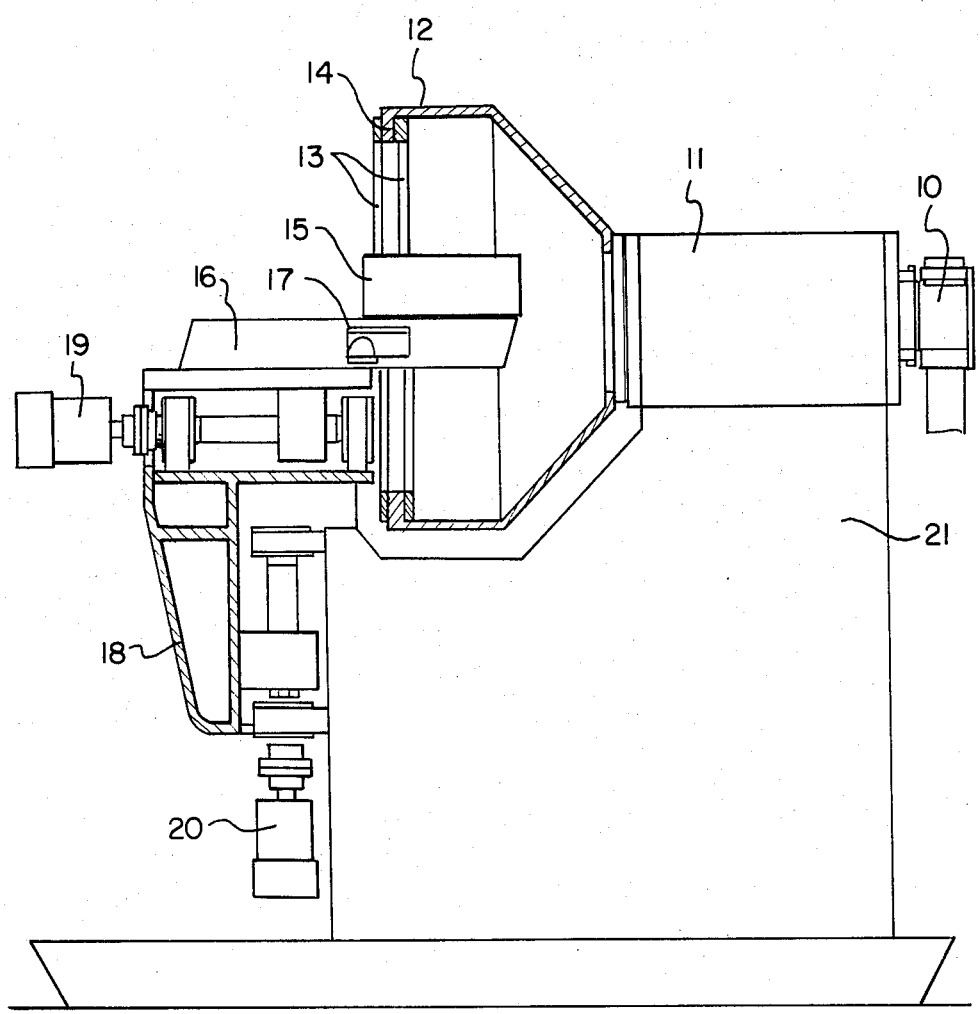
FIG. 5 is an illustration of a two blade internal-hole saw.

FIG. 5 shows a two-blade internal-hole saw for carrying out the method of the present invention.

In FIGS. 1, 2, 3 and 4, internal-hole saw 1, which is shown schematically, has two mutually parallel saw blades 2, by means of which the crystalline rod 3 is sawed into three rod portions separated by the cutting gaps 4. The crystalline rod can be a monocrystalline silicon rod which has been manufactured by crucible-free zone pulling or by crucible-pulling according to Czochralski. Alternatively, the rod can be a block of cast, coarsely crystalline silicon of columnar structure which is suitable for solar cells with the usual square 100 mm × 100 m cross-section. The sawing operation can be continued until the rod portions are completely separated from one another; it is also possible, however, to leave an unsawed residual portion of rod as a connection between the individual rod portions.

Figure 1:
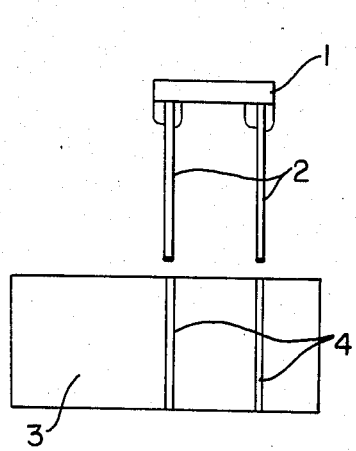
FIGS. 1, 2, 3 and 4 illustrate the method of the present invention using a two blade internal-hole saw.
Figure 2:
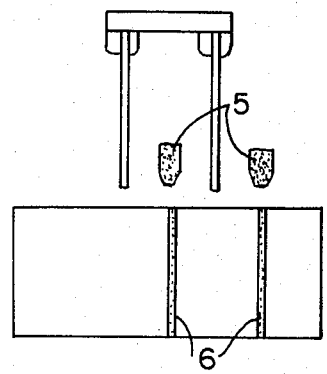

FIG. 2 shows schematically a filling station 5 for introducing a connecting agent 6 into the cutting gaps between the portions of the rod. This step can be omitted if the rod portions are not completely separated from one another, but are held together by a residual portion of the rod or, if the rod is completely cut through, by a binding that is not cut through and is cemented to the outside of the rod. However, the connection may be additionally stabilized by the connecting agent introduced into the cutting gaps so that the risk of breaking is reduced. If portions of the rod are no longer connected to one another, it is necessary to reconnect them to one another by introducing a connecting agent into the cutting gaps.

Figure 3:
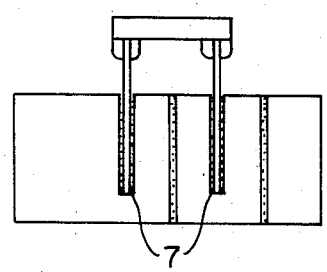

According to FIG. 3, the subsequent cut 7 may be positioned at a place on the crystalline rod which is spaced further from the previous cut than the required thickness of a wafer. Advantageously, integral multiples of the sum of the desired wafer thickness and the cutting-gap thickness are selected as the cutting distance. It is also possible to leave any desired portions of the crystalline rod, if, for example, they contain impurities, mechanical damage and the like. A sequence of cuts by which the crystalline rod is sawed wafer by wafer, by consecutive cuts, spaced at the thickness of the wafer is, in principle, possible, but involves the risk of displacement of wafers into one another if the connection between the sawed-off wafers and the crystalline rod has not hardened completely before the next cut.

Figure 4:
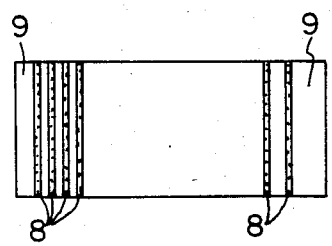

FIG. 4 shows the plurality of wafers 8 having the desired thickness and connected to one another after completion of the cutting sequence. The two edge pieces 9, which are generally thicker than the wafers themselves, are discarded. The end pieces generally contain a high concentration of impurities, or have a defective columnar structure in the case of coarsely crystalline silicon blocks, or, they are fixed, as bindings, to the blocks to be sawed. After the connecting agent has been removed and the wafers have been cleaned, the individual wafers are further processed, for example, in the case of silicon, to form solar cells or electronic components.

As suitable connecting agents are materials that can rapidly form a solid and mechanically strong connection between the portions of rod but can also be readily removed. A suitable connecting agent is wax which is introduced into the cutting gaps in the molten state, hardened to form a stable connection between the portions of rod and can be removed by melting. The adhesives listed under DIN 16920 are also suitable, especially construction adhesives such as cyanoacrylates, melt adhesives or metal cements, which form connections that can be removed by the addition of a solvent or by heating. Gypsum, which is inexpensive but hardens relatively slowly, can be used as a connecting agent, particularly in the form of a suspension. Depending on the strength of the connection required and the connecting agent used, complete filling of the cutting gap is not necessary and the portions of the rod can be connected in places or at points. Incomplete filling of the gap or discrete connection is adequate especially if the crystalline rod is not cut through completely during the cutting operation.

The residual portion of the rod which forms the connection between the wafers can be removed, in the case of crystalline rods of circular cross-section, by means of sawing or grinding in the longitudinal direction to provide a wafer with a flat spot. Blocks for square wafers can have a rectangular cross-section, for example 103×100 mm, or, in the case of a square cross-section, may be provided with a binding on one or more sides. If square wafers having a side length of 100 mm are sawed from the block, then the residual portion of the block which has not been cut through, or the binding, forms a connection between the wafers. After cutting or grinding to separate the wafers, wafers of the desired size can be obtained. Blocks comprising a plurality of wafers connected to one another can be fitted into each other, if the wafer and cutting gap thicknesses are compatible, after the connecting agent has been removed, so that the connecting cross-pieces are opposed to each other and can be removed simultaneously from the two sides.

Since, in the method of the invention, the sawed off wafers remain connected to the adjacent portions of rod and do not have to be removed immediately after each cutting operation, the crystalline rod or block to be sawed can be fastened to a supporting carrier without difficulty. In particular, blocks having a flat side face such as blocks of solar silicon having a square cross-section and a columnar structure, and sawed, in general, from a larger block, may readily be glued, cemented, or, if impurities from residual amounts of adhesive are to be avoided, frozen with water to a carrier. Crystalline rods having a round cross-section can be relatively easily fastened by means of one or more cemented or glued cutting ledges, to a carrier. It is also advantageous to use carriers which can be removed from the apparatus for convenient mounting of the crystalline rod or block to be sawed and then replaced on the apparatus with the mounted rod or block. The rods or blocks can be attached to the carrier by means of mechanical mounting devices. This has the advantage that the sawed rod consisting of wafers connected to one another can be removed easily.

The use of mobile, removable carriers which can be remounted on the apparatus in a reproducible, accurately defined position, has the advantage that during the sawing operation, it is possible to fasten the next workpiece to a carrier which has been removed from the apparatus. When the sawing operation has been completed, the carrier having a new workpiece attached is exchanged for the carrier having the sawed workpiece, so that the sawing operation can be continued. During the sawing operation on the workpiece in the sawing apparatus, the sawed wafers connected to one another can be separated from the carrier which is removed from the apparatus and a new workpiece fastened to the carrier. The carrier having the new workpiece attached is then ready for exchange with the carrier in the sawing apparatus.

FIG. 5 shows an embodiment of a two-blade internal-hole saw suitable for carrying out the method of the present invention. It comprises a tubular drive support 11 which is connected to a drive means 10 and passes into a tension ring support 12 that widens in the form of a bowl. The ring support 12 carries a tension ring 14, which is adapted for mounting two saw blades 13 which are aligned parallel and tensioned. By use of a tension ring suitable for mounting one or a plurality of saw blades, the apparatus can be used as a one-blade or multiple-blade apparatus. The saw blades rotate about the workpiece 15, which can be a crystalline rod or block fastened to the workpiece-holding device or carrier 16. Inside the region of the internal-hole of the saw there can be provided a cutting-gap filling station 17, if necessary by means of which the cutting gap formed after each cutting step can be filled with a connecting agent. Such a cutting-gap filling station can be dispensed with when the connection between the sawed off wafers is stable enough to prevent breaking or displacement as previously discussed in regard to FIG. 2. The workpiece-holding device is connected via a bracket 18 to a feed device 19 and an advance device 20, by means of which the workpiece is placed in the desired cutting position and moved into the saw blades. The whole arrangement rests on a bench 21 shown here only in schematic form.

Preferably, the feed of the workpiece is not controlled by hand, but is controlled by a computer, which is not shown in FIG. 5. From predetermined parameters such as rod length, wafer thickness, cutting gap thickness, and edge-region thickness, the computer can determine an optimized cutting sequence with respect to maximum wafer yield taking into consideration the tolerances required, the number of saw blades, the hardening time required by the connecting agent, and the regions of the workpiece which are not to be sawed. By means of a stepping motor, the computer can place the workpiece in the appropriate cutting position. Feed devices controlled by computers are being used in numerous technical processing operations and are familiar to a person skilled in the art.

The introduction of the connecting agent into the cutting gaps after a cut has been completed can also be controlled by the computer. In the case of a stationary gap-filling station which is in a position off-set with respect to the saw blades, the cutting gap to be filled is advanced towards the filling, of the filling station, which can be a nozzle of suitable cross-section, by means of the feed device. The cutting gap is filled with the selected connecting agent completely, partially or at points, as required. However, in the case of a stationary gap-filling station, the filling members are preferable placed in a position adjacent to the saw blades so that after the sawing operation has been completed, the connecting agent can be introduced into the cutting gaps without displacing the workpiece.

In addition to the stationary embodiment of the gap-filling station, a movable design is also useful in which case the workpiece is not moved, but the gap-filling station having the filling member is advanced towards the cutting gaps. An apparatus having a movable gap filling station is particularly useful in an apparatus where the internal-hole saw blades and not the workpiece are moved to the desired cutting position. Apart from the stationary or movable embodiments, a plurality of forms of constructions which are familiar to a person skilled in the art and the different designs which do not affect the basic inventive idea, can be conceived for the gap-filling station, depending on the connecting agent used.

This applies, in general, to variations in the kinematic construction of the present arrangement; for example, when the positioning for cutting is effected by movable saw blades instead of by a movable workpiece, or when cutting is effected by moving the saw blades through the statinary workpiece instead of by moving the workpiece in the direction of the external wall of the saw blades. In principle, a vertical arrangement of the crystalline rod or block to be sawed, with horizontal cutting, is possible. A horizontal arrangement with vertical cutting is prepared to take advantage of the gravitational forces acting on the connecting agent in the cutting direction.

When a multiple-blade internal-hole saw is used, particularly in the case of the two-blade arrangement described above, the actual sawing operation is carried out in a manner analogous to the prior art relating to one-blade internal-hole saws. A person skilled in the art is familiar with measures such as the selection of a suitable saw blade, tensioning of the saw blade, cooling during sawing operation and the like, and no further explanation is required. The spacing of the saw blades can also be varied within wide limits. When using n saw blades, the spacing should not exceed one nth portion of the length of the workpiece that is, in the case of two saw blades it should be not more than half the length of the rod or block in order to achieve optimum cutting without idling a saw blade. The size of the minimum spacing should be selected such that the portion of the workpiece between two rotating saw blades cannot be centrifuged away or displaced even in case of complete separation.

Coarsely crystalline silicon blocks having a columnar structure, and having, for example, a length of 250 mm and a cross-section of 100×100 mm can be sawed into approximately 350 um thick wafers using a two-blade internal-hole saw according to the invention. In the method, a block fastened to a carrier by means of paraffin wax is attached to the workpiece-holding device and, by means of a stepping motor having a castorball spindle, is placed in the cutting position determined by computer on the basis of the given parameters, wafer thickness, cutting gap thickness, edge-piece thickness, and cutting tolerance. A further drive having a castorball spindle then moves the block towards the parallel rotating saw blades spaced 50 mm apart until the block is completely cut through. The block is then placed in the starting position before the next cut is made and paraffin wax is introduced into the cutting gaps from heated nozzles of the filling station, which are in a position adjacent to the saw blades. During the hardening period, the block is moved to the next cutting position spaced several wafer thicknesses from the previous cut and the next cut is commenced. The operation is repeated until the crystalline block has been divided into a plurality of wafers approximately 350 um thick and connected to one another by paraffin wax. The wafers, together with the carrier, are then removed from the workpiece-holding device and separated from one another by melting of the wax while a carrier prepared with an unsawed crystalline block attached thereto is installed in the workpiece-holding device for sawing.

According to a favorable embodiment of the inventive method, means are provided for arranging the workpiece to be sawed so that it can be rotated in a preferably horizontal or vertical direction, the rotational axis being situated inside or outside the workpiece and perpendicular to its longitudinal axis. Then, for instance, a rod can be sawed from one end as well as, after a 180° rotation, from its other end. One possibility is, for example, to saw approximately half of the rod or block from one end, and then, after a 180° rotation, to saw the remaining part from the other end. It is also possible, to separate readily sawed parts from one end of the rod, while after a 180° rotation the other end is being worked.

Thus, by a sequence of the measures sawing a part of the rod from one end—180° rotation—separating the sawed part of the rod—sawing a part of the rod from the other end etc., even long rods can be sawed in small sawing devices. The sawed parts of the rod being separated consist of a plurality of wafers that are connected to one another. This connection is then broken to separate the wafers.

Moreover, embodiments are possible where a plurality of workpieces, preferably two, are mounted on a rotatable carrier. By rotation of the carrier, the workpieces are mutually brought into a position, where they can be sawed, and into a position, where, e.g., sawed parts of the rod can be separated, measured, or connecting means can be applied.

Thus, the inventive method can also be carried out in devices whose dimensions are not suitable for the reception of the whole workpiece to be sawed.

The method of the present invention in conjunction with the two-blade internal-hole saw suitable for carrying out the method provide for sawing of crystalline rods or blocks into thin wafers, using a multiple-blade arrangement, without expensive removal devices and with little risk of breakage.

What is claimed is:

1. A multiple blade internal hole saw for sawing a crystalline workpiece into wafers having a wafer thickness in the range of approximately 0.1 mm to 1.0 mm, comprising:

means for sawing an elongated workpiece of material, by a sequence of cuts, into a plurality of thin wafers that are connected to one another, said means for sawing including at least two blades for simultaneously making at least two cuts in the workpiece such that the thin wafers formed thereby remain connected together, each blade spaced from an adjacent blade by a distance of at least approximately 10 mm;

first means for rotatably controlling said at least two blades to simultaneously make at least two cuts in the workpiece; and second means for controlling one of said workpiece and said at least two blades so that said at least two blades repeatedly and simultaneously make at least two additional cuts at different locations along said workpiece such that the thin wafers formed thereby remain connected together, one of said two additional cuts being between said previous at least two cuts.

2. A multiple blade internal hole saw according to claim 1 further comprising means for maintaining a connection between adjacent cut wafers.

3. A multiple blade internal hole saw according to claim 2, wherein said means for maintaining includes a filling station for introducing a connecting agent into cutting gaps between each of said adjacent sawed wafers.

* * * * *